No. 810,492. PATENTED JAN. 23, 1906.
R. N. MARTZ.
VEHICLE.
APPLICATION FILED AUG. 19, 1905.
2 SHEETS—SHEET 1.
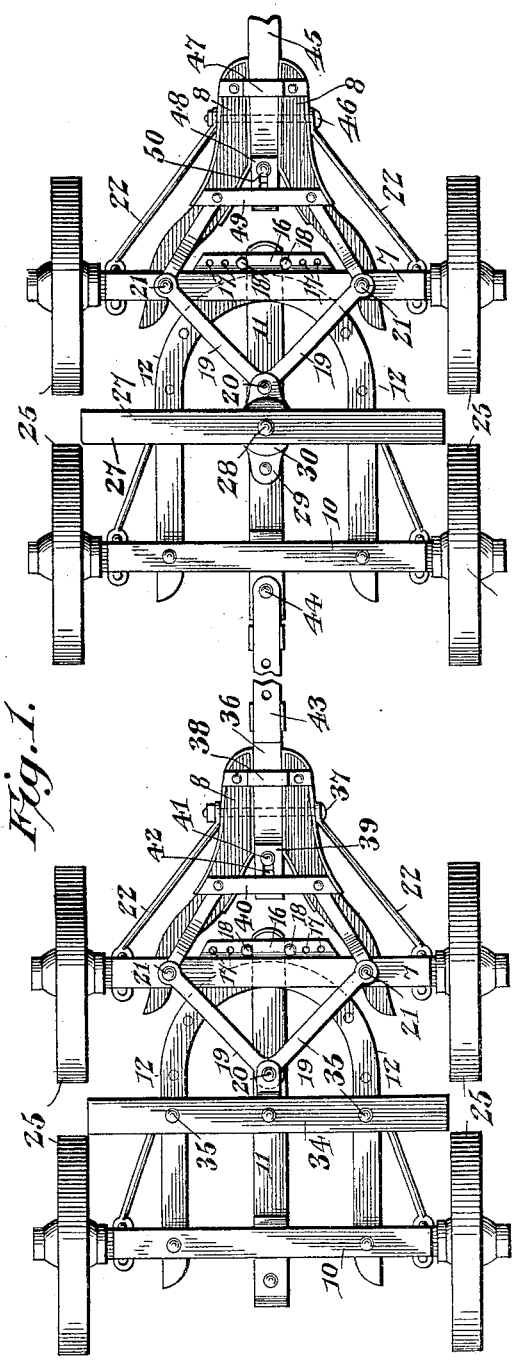
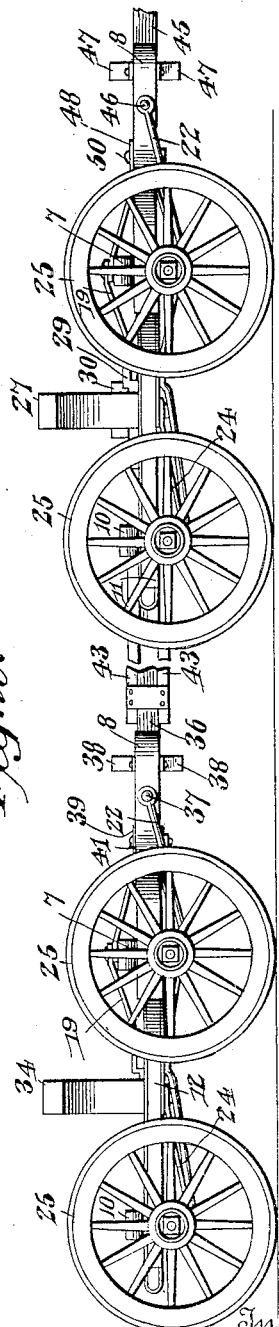
Witnesses
Howard D. Orr.
B. G. Foster.
Inventor,
Randolph N. Martz,
By E. G. Siggers.
Attorney No. 810,492. PATENTED JAN. 23, 1906.
R. N. MARTZ.
VEHICLE.
APPLICATION FILED AUG. 19, 1905.
2 SHEETS—SHEET 2.
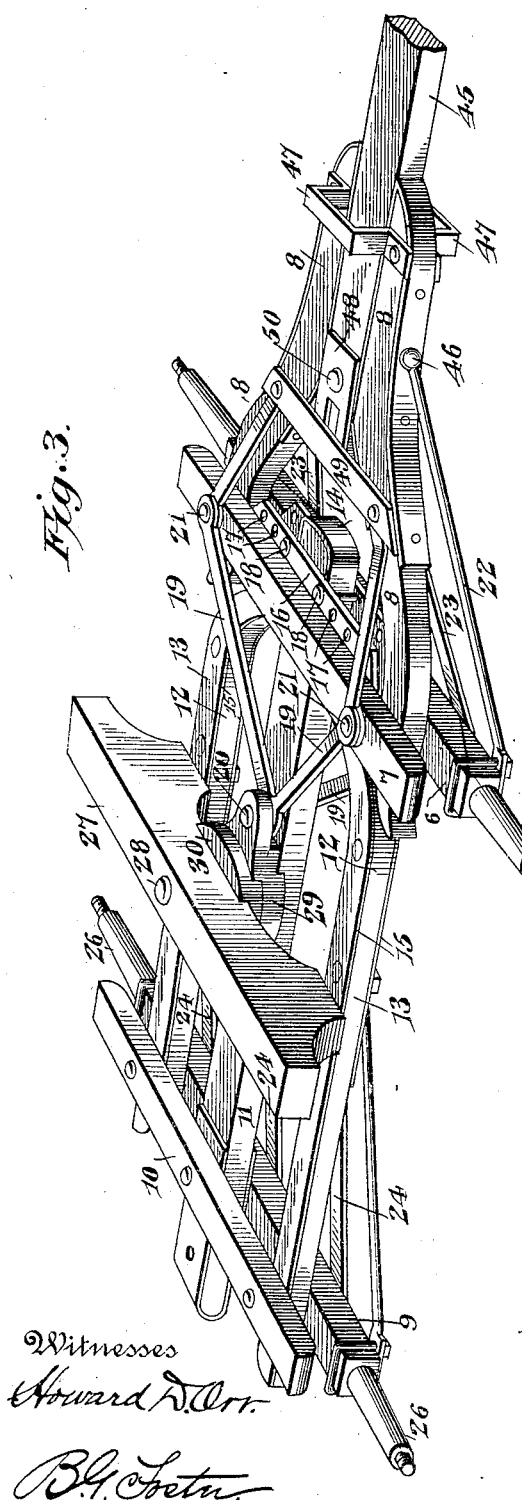
Witnesses
Howard D. Orr.
B. G. Foetn.
Randolph N. Martz, Inventor,
By E. G. Siggers.
Attorney.

UNITED STATES PATENT OFFICE.

RANDOLPH N. MARTZ, OF FREDERICK, MARYLAND.

VEHICLE.

No. 810,492.  Specification of Letters Patent.  Patented Jan. 23, 1906.

Application filed August 19, 1905. Serial No. 274,898.

*To all whom it may concern:*

Be it known that I, RANDOLPH N. MARTZ, a citizen of the United States, residing at Frederick, in the county of Frederick and State of Maryland, have invented a new and useful Vehicle, of which the following is a specification.

This invention relates particularly to vehicles of the eight-wheel type employed in transporting heavy objects, such as logs, though there are features not necessarily limited to this specific form. As is well known, vehicles of the above character are ordinarily subjected to heavy stresses and strains and often necessarily travel over rough ground. While it is therefore essential that various of the parts have relative movement or play, still it is necessary that the same be limited in order to prevent the lashing of the tongue and consequent injury to the animals. This is particularly true where horses are used, for when oxen are employed the parts can be allowed greater freedom of movement with a consequent better action on the part of the vehicle as a whole. Moreover, it often happens that one or more wheels will encounter an obstacle or become stalled in a rut, making it very desirable to cramp the same in order to free them.

The principal object in the present invention is to provide a novel structure of a simple character that has the various qualifications noted above as of importance, and the preferred embodiment of such invention is illustrated in the accompanying drawings, wherein—

Figure 1 is a top plan view of the vehicle. Fig. 2 is a side elevation of the same. Fig. 3 is a detail perspective view of the front truck. Fig. 4 is a longitudinal sectional view through said truck. Fig. 5 is a cross-sectional view therethrough on the line 5 5 of Fig. 4.

Similar reference-numerals designate corresponding parts in all the figures of the drawings.

In the embodiment illustrated the vehicle is made up of two trucks. As these trucks are duplicates with but slight exception, a description of one is thought to be sufficient to an understanding of both. A front axle 6 is employed, over which is supported an axle-bolster 7, spaced from the axle 6 by forwardly-extending pole-member tongues 8. A rear axle 9 has associated therewith another axle-bolster 10, and secured between said axle 9 and bolster 10 is a frame consisting of a central bar 11 and a truck-hound 12, having side members 13, the front end of said truck-hound being curved and the central bar 11 projecting in advance of the same, as shown at 14. The upper and under faces of the truck-hound are shod with steel 15. The front end 14 of the central bar 11 and the front end of the truck-hound are located between the front-axle bolster 7 and the front axle 6, the said front end of the central bar 11 transversely overlapping the same and being movable longitudinally thereof. Wear-plates 16 are carried by the inner sides of the axle and bolster and project in advance of the same, having openings 17 to receive detachable pins 18, that are arranged on opposite sides of the front end 14 of the central bar 11.

The front axle 6 and bolster 7 are pivotally connected to the frame by means of rigidly-extending links or braces 19, convergently disposed and pivoted, as shown at 20, to the central bar 11 between the axles, the front ends of said links or braces being rigidly bolted to the axle and bolster, as shown at 21, the bolts 21 also serving to secure the tongue-hounds 8 in place. Suitable braces 22 and 23 serve to connect the front axle 6 to the hounds 8, and the rear axle 9 is reinforced by braces 24, connected to the central bar 11 and to the side members 13 of the truck-hound.

So far as thus described the two trucks are the same, being provided with wheels 25 of any suitable structure, journaled on the spindles 26 of the axle. The only difference between the two trucks resides in the manner of mounting the truck-bolsters. The front truck has a bolster 27, pivoted by a king-bolt 28 to the central bar 11 of the frame and having a rotary bearing in the form of relatively rotatable coöperating plates 29 and 30. The base-plate 29 is secured upon the central bar 11 and has a curved groove 31, in which a depending flange 32 of the upper plate moves, the said plate 30 also having a seat 33 to receive the bolster. By this arrangement the bolster can have a free rotary movement; but lateral pressure thereon is resisted by the interlocking engagement of the plates 29 and 30, thus relieving the king-bolt 28 of the greater part of the strain. The rear truck is provided with a truck-bolster 34, which is bolted, as shown at 35, to the side members 13 of the truck-hound, and consequently is rigidly secured in place.

The two trucks are connected by a pole member in the form of a reach, said reach having a bar 36 connected by a horizontal pivot 37 between the hounds 8 of the rear truck, the up-and-down swinging movement of the bar 36 being limited by keeper-yokes 38. Upon the rear end of the bar 36 is slidably mounted a locking device in the form of a three-sided plate 39, that is arranged to engage between a pair of holding-bars 40, connecting the hounds and forming a socket between them. The locking device is arranged to be clamped in any of a plurality of positions by means of a bolt 41, passing through a slot 42 in said device. Secured to the front end of the bar 36 are spaced bars 43, the front ends of which are connected, as shown at 44, to the rearwardly-projecting end of the central bar 11 of the front truck. The tongue 45 is connected to the front truck in the same manner that the reach is connected to the rear truck, and in the claims it is intended by the term "pole member" to cover either the tongue or the reach. Said tongue 45 is pivoted by a horizontal bolt 46 between the hounds 8 and is thus capable of an up-and-down swinging movement, the movement, however, being limited by the keeper-stirrups 47. The rear end of the tongue is provided with a sliding locking device 48, that is arranged to engage in a socket formed between the bars 49, connecting the hounds, the locking device being held by the bolt 50.

A vehicle as thus constructed can be employed either with horses or oxen. When the former are hitched thereto, the pins 18 are disposed directly adjacent to the front end 14 of the central bar 11. The locking devices 39 and 48 are engaged in their sockets, and consequently the vehicle is comparatively rigid. There is thus little liability of any side lashing on the part of the tongue. If, however, oxen are used, the various parts can be left free, so that the vehicle is limber and can pass freely over obstructions and rough ground without localizing any undue or abnormal strains. Moreover, by placing the pins 18 at different distances from the front end of the central bar the limits of movement of the parts can be varied as desired. Furthermore, if when the vehicle is made rigid the wheels strike an obstruction or become stalled by detaching the pins 18 the front wheels of both trucks can be readily cramped, and thus often freed, whereas in the case of a rigid vehicle which cannot be limbered it would be a difficult task to extricate the same and would, perhaps, require unloading. Thus it will be seen that the embodiment of the invention has the desirable features set forth in the preliminary portion of the specification.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

1. In a vehicle of the class described, a truck comprising front and rear axles, a frame secured to one of the axles, a connection for the other axle pivoted to the frame between the axles, and means for limiting the swinging movement of the pivotally-connected axle, said means being adjustable to vary the limits of movement of said axle.

2. In a vehicle of the class described, a truck comprising front and rear axles, a frame secured to one of the axles, a connection for the other axle pivoted to the frame between the axles, and means detachably mounted on the swinging axle and movable into engagement with a portion of the frame to limit the swinging movement of the said pivotal axle.

3. In a vehicle of the class described, a truck comprising front and rear axles, a frame secured to one of the axles and having a portion transversely overlapping the other, a connection for said other axle pivoted to the frame between the axles, and a pin detachably and adjustably mounted in the swinging axle and engaging the overlapping portion of the frame to limit the swinging movement of said axle.

4. In a vehicle of the class described, a truck comprising front and rear axles, a bar rigidly affixed to one of the axles and transversely overlapping the other, a connection rigidly affixed to said other axle and pivoted to the bar, and pins carried by the swinging axle and located on opposite sides of the bar, said pins being adjustable toward and away from each other to vary the limits of the swinging movement of the axle.

5. In a vehicle of the class described, a truck comprising a rear axle, a frame fixed to said rear axle and consisting of a central bar, and a truck-hound having side members secured to the rear axle on opposite sides of the bar, said bar extending in advance of the front end of the truck-hound, a front axle, rearwardly-extending braces connected to the front axle and pivoted to the bar in rear of its front end, said front axle swinging upon the hound and bar, and pins detachably carried by the front axle and located on opposite sides of the front end of the bar.

6. In a vehicle of the class described, a truck comprising axles, connections rigidly carried by the respective axles and pivoted to each other between the axles, the connection of one of the axles transversely overlapping the other axle and being longitudinally slidable upon the same, and means for limiting such sliding movement.

7. In a vehicle of the class described, the combination with an axle, of a bolster mounted on the axle, another axle, a frame carried by the other axle and having a portion disposed transversely of and slidable longitudinally with respect to the bolster, means pivotally connecting the axle and bolster to the frame, and means carried by the bolster for limiting the relative movement of the bolster and the portion of the frame associated therewith.

8. In a vehicle of the class described, the combination with an axle, of a bolster mounted on the axle in spaced relation thereto, another axle, connecting means carried by the other axle and having a portion sliding between the first-mentioned axle and bolster longitudinally of the same, and means connecting said axle and bolster for limiting such sliding movement.

9. In a vehicle of the class described, the combination with a front axle, of a bolster extending longitudinally thereof, fore hounds interposed between the axle and axle-bolster and separating the same, a rear axle, a frame secured to the rear axle and including a bar that is slidable between the axle and bolster carried thereby, means connecting the front axle and bolster to the frame, and detachable devices connecting the front axle and bolster to limit the movement of the portion of the frame that is between them.

10. In a vehicle of the class described, the combination with a front axle, of a bolster rigidly secured thereto and spaced therefrom, a rear axle, a frame rigidly secured to the rear axle and comprising a truck-hound and bar, the front portions of which are slidable between the front axle and bolster, shoes carried by the truck-hound, wear-plates carried by the axle and bolster, and pins passing through the wear-plates and located on opposite sides of the frame-bar to limit the movement thereof.

11. In a vehicle of the class described, the combination with a truck, of a member pivoted to the truck, said truck and member being provided, one with a socket, the other with a locking device that is movable into the socket to hold the member against its pivotal movement.

12. In a vehicle of the class described, the combination with a truck, of a pole member pivoted to the truck and having an up-and-down swinging movement with respect to the truck, said truck and pole member being provided, one with a socket, the other with a movable locking device that is arranged to engage in the socket to hold the member against its pivotal movement.

13. In a vehicle of the class described, the combination with a truck having a socket, of a pole member pivoted to the truck and having an up-and-down swinging movement with respect thereto, and a locking device slidably mounted on the pole member and movable into the socket to hold the pole member against its swinging movement.

14. In a vehicle of the class described, the combination with a truck having forwardly-projecting spaced hounds, cross-bars connecting the hounds and forming a socket between them, a pole member pivoted to and between the hounds in advance of the socket, and a locking device slidably mounted on the rear end of the pole member and movable into and out of the socket.

15. An eight-wheeled wagon comprising separate four-wheeled trucks, each truck consisting of a front axle, a bolster, forwardly-extending hounds interposed between the axle and bolster, a rear truck, a frame rigidly secured to the rear truck and slidably mounted between the front axle and bolster, pivotal connections between the front axle and bolster and the frame, means connecting the front axle and bolster to limit the swinging movement of the same, said means engaging the frame, and a truck-bolster mounted on the frame, a reach-pole pivoted between the hounds of the rear truck and connected to the front truck, means for limiting the swinging movement between the rear pole and rear truck, a tongue pivoted between the hounds of the front truck, and means for limiting the swinging movement of said tongue.

16. In a vehicle of the class described, a truck comprising front and rear axles, a frame connecting the axles, a truck-bolster pivotally mounted on the frame, and a rotary bearing for said bolster interposed between the same and the frame, said bearing comprising revolubly associated plates, one of which is provided with a curved recess, the other having a flange that turns in said recess.

In testimony that I claim the foregoing as my own I have hereto affixed my signature in the presence of two witnesses.

RANDOLPH N. MARTZ.

Witnesses:
A. C. McCardell,
A. Le Roy McCardell.